United States Patent
Kawajiri (10) Patent No.: US 11,184,500 B2
(45) Date of Patent: Nov. 23, 2021

(54) IMAGE COMMUNICATION APPARATUS, METHOD OF CONTROLLING SAME, AND STORAGE MEDIUM

(71) Applicant: CANON KABUSHIKI KAISHA, Tokyo (JP)

(72) Inventor: Kensuke Kawajiri, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/407,308

(22) Filed: May 9, 2019

(65) Prior Publication Data

US 2019/0356799 A1    Nov. 21, 2019

(30) Foreign Application Priority Data

May 17, 2018  (JP) .............................. JP2018-095638

(51) Int. Cl.
*H04N 1/00*    (2006.01)
*H04N 1/333*   (2006.01)

(52) U.S. Cl.
CPC ..... *H04N 1/00888* (2013.01); *H04N 1/00904* (2013.01); *H04N 1/333* (2013.01)

(58) Field of Classification Search
None
See application file for complete search history.

(56) References Cited

U.S. PATENT DOCUMENTS

| | | | | |
|---|---|---|---|---|
| 5,909,488 A * | 6/1999 | Koizumi | ............ | H04N 1/00885 379/376.02 |
| 6,088,128 A * | 7/2000 | Nishii | ................ | H04N 1/00885 358/434 |
| 6,266,159 B1 * | 7/2001 | Otsuka | ............... | H04N 1/00127 358/405 |
| 6,323,962 B1 * | 11/2001 | Itoh | ..................... | H04N 1/00204 358/407 |
| 2014/0168703 A1 * | 6/2014 | Nakagawa | .......... | H04L 65/1006 358/1.15 |
| 2017/0070630 A1 * | 3/2017 | Kozuka | ..................... | H04M 3/02 |
| 2018/0091675 A1 * | 3/2018 | Ohara | ................ | H04N 1/32708 |

FOREIGN PATENT DOCUMENTS

| | | | |
|---|---|---|---|
| CN | 102310668 A | 1/2012 | |
| CN | 102377903 A | 3/2012 | |
| CN | 104427162 A | 3/2015 | |
| JP | H09168062 A | 6/1997 | |
| JP | 2000013523 | * 1/2000 | ............... H04N 1/00 |
| JP | 2016100810 | * 5/2016 | ............... H04N 1/00 |
| JP | 2016225936 | * 12/2016 | ............... H04N 1/32 |

OTHER PUBLICATIONS

Office Action issued in Chinese Appln. No. 201910397972.1 dated Dec. 28, 2020.

* cited by examiner

*Primary Examiner* — Beniyam Menberu
(74) *Attorney, Agent, or Firm* — Rossi, Kimms & McDowell LLP (57) ABSTRACT

An image communication apparatus has, as operation states, a first power state and a second power state with lower power consumption than the first power state. The apparatus comprises a ringing unit that rings according to an predetermined incoming signal from an external; a setting unit that sets whether the ringing unit rings according to the predetermined incoming signal or not; and a control unit that shifts the operation state from the first power state to the second power state based on at least the setting set by the setting unit.

21 Claims, 11 Drawing Sheets

| 801 | RECEPTION MODE | AUTOMATIC RECEPTION OR FAX/TEL SWITCHING OR MANUAL RECEPTION |
|---|---|---|
| 802 | RINGING SETTING | ON or OFF |

IMAGE COMMUNICATION APPARATUS, METHOD OF CONTROLLING SAME, AND STORAGE MEDIUM

BACKGROUND OF THE INVENTION

Field of the Invention

The present invention relates to an image communication apparatus having a facsimile function, a method of controlling the same, and a storage medium.

Description of the Related Art

In an image communication apparatus having a facsimile function, it is possible to automatically distinguish whether an incoming signal is an incoming fax data signal or an incoming telephone call. An apparatus having a non-ringing incoming signal function for sounding a ringtone when a telephone call arrives and not sounding a ringtone when a fax is received is known.

In such an apparatus, if power is supplied from a public line to an NCU (network control unit), control is performed to detect a signal of the public line and sound a ringtone. In contrast, when using a non-ringing incoming signal function, it is necessary to distinguish whether a signal from the public line is an incoming fax data signal or an incoming telephone call. Because this distinguishing is performed by a controller unit, when using the non-ringing incoming signal function, the public line is not connected to the NCU. In such a case, supply of power to the NCU is supplied from a power supply of the image communication apparatus.

In addition, in an image communication apparatus, maintaining a sleep state in which supply of power to portions not being used is stopped in order to realize power saving is commonly known. However, to perform a non-ringing operation as described above, it is necessary to supply sufficient power to the NCU even in the sleep state. For example, Japanese Patent Laid-Open No. H09-168062 recites regarding having a non-ringing incoming signal mode and a power saving standby mode for reducing power consumption for a standby period, and regarding power consumption control for standby period when in the non-ringing incoming signal mode.

However, there is a problem as is recited below in the foregoing conventional technique. For example, in the conventional technique described above, when using the foregoing non-ringing incoming signal function, it is necessary for the NCU, to which power is supplied from the power supply of the image communication apparatus, to generate a pseudo call signal for sounding a ringtone. However, when the image communication apparatus transitions to a power saving state such as a sleep state, there are cases where power from a power supply decreases, and it ceases to be possible to generate a pseudo call signal or supply power to the NCU. In contrast, in the power saving state, when a power supply for generating the aforementioned pseudo call signal is guaranteed, the power saving effect will decrease.

SUMMARY OF THE INVENTION

The present invention enables realization of a mechanism for suitably performing power saving control in consideration of the necessity of non-ringing control, so as to avoid a state where it is not possible to guarantee power necessary for the non-ringing control.

One aspect of the present invention provides an image communication apparatus having, as operation states, a first power state and a second power state with lower power consumption than the first power state, the apparatus comprising: a ringing unit that rings according to an predetermined incoming signal from an external; a setting unit that sets whether the ringing unit rings according to the predetermined incoming signal or not; and a control unit that shifts the operation state from the first power state to the second power state based on at least the setting set by the setting unit.

Another aspect of the present invention provides a method of controlling an image communication apparatus having, as operation states, a first power state and a second power state with lower power consumption than the first power state, the method comprising: ringing, by a ringing unit, according to an predetermined incoming signal from an external; setting whether the ringing unit rings according to the predetermined incoming signal or not; and shifting the operation state from the first power state to the second power based on at least the set setting.

Still another aspect of the present invention provides a non-transitory computer-readable storage medium storing a computer program for causing a computer to execute each step in a method of controlling an image communication apparatus having, as operation states, a first power state and a second power state with lower power consumption than the first power state, the method comprising: ringing according to an predetermined incoming signal from an external; setting whether to ring according to the predetermined incoming signal or not; and shifting the operation state from the first power state to the second power based on at least the set setting.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of Image Communication Apparatus>

Description is given below regarding a first embodiment of the present invention, with reference to the attached drawings. Firstly, with reference with FIG. 1, description is given regarding an example of a configuration of an image communication apparatus 10 according to the present embodiment.

Figure 1:
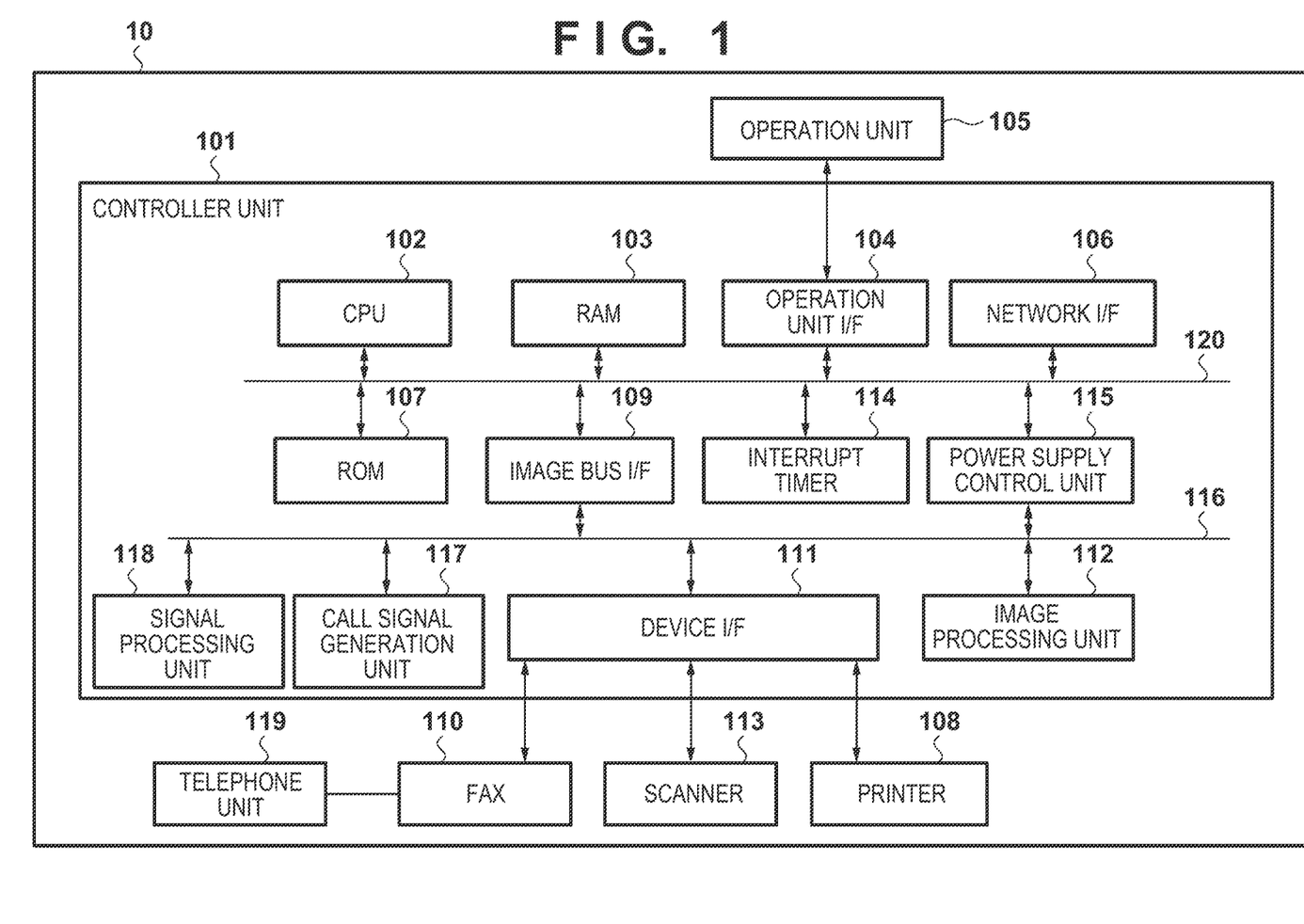
FIG. 1 is a block diagram illustrating a control configuration of an image communication apparatus according to an embodiment.

The image communication apparatus 10 is provided with a controller unit 101, an operation unit 105, a printer 108, a fax machine 110, a scanner 113, and a telephone unit 119. The controller unit 101 is provided with a CPU 102, a RAM 103, an operation unit I/F 104, a network I/F 106, a ROM 107, an image bus I/F 109, an interrupt timer 114, and a power supply control unit 115. Each of these components is connected via a system bus 120. In addition, the controller unit 101 is provided with a device I/F 111, an image processing unit 112, a call signal generation unit 117, and a signal processing unit 118 which are connected via an image bus 116. The controller unit 101 is connected to the scanner 113, which acts as an image input device for reading an image of a document or the like, and inputting image data. In addition, the controller unit 101 is connected to the printer 108, which acts as an image output device for outputting an image in accordance with image data. The controller unit 101 is further connected to the fax machine (a network control unit) 110 which transmits and receives fax images.

The CPU 102 comprehensively controls the entirety of the controller unit 101. The RAM 103 is a system work memory for the CPU 102 to operate, and is an image memory for temporarily storing image data. The ROM 107 is a boot ROM, and a boot program for the system is stored therein.

The power supply control unit 115 is connected to both of the system bus 120 and the image bus 116, supplies power necessary for operation of each unit inside the image communication apparatus 10, and is controlled by the CPU 102. The interrupt timer 114 generates a timer interrupt at a time designated by the CPU 102, and notifies it to the power supply control unit 115.

The operation unit I/F 104 is a unit that interfaces with the operation unit 105, and outputs, to the operation unit 105, image data to be displayed on the operation unit 105. In addition, the operation unit I/F 104 has a function for conveying, to the CPU 102, information that a user has inputted from the operation unit 105. The network I/F 106 is connected to a network, and inputs and outputs information. The call signal generation unit 117 outputs a pseudo call signal to the telephone unit 119. The signal processing unit 118 detects a signal inputted from the telephone line. Each device described above is arranged on the system bus 120.

The image bus I/F 109 is a bus bridge for converting a data structure, and is connected to both of the system bus 120 and the image bus 116 which is for transferring image data at high speed. The image bus 116 is configured by a PCI bus or IEEE 1394. Each device for the device I/F 111 and the image processing unit 112 is arranged on the image bus 116. The device I/F 111 is connected to the scanner 113, the printer 108, the fax machine 110, and the controller unit 101. The fax machine 110 is connected to the telephone unit 119, which rings in response to a setting for a time of an incoming signal. The image processing unit 112 performs correction, processing, and editing on image data.

<Power Supply Circuit>

Figure 2:
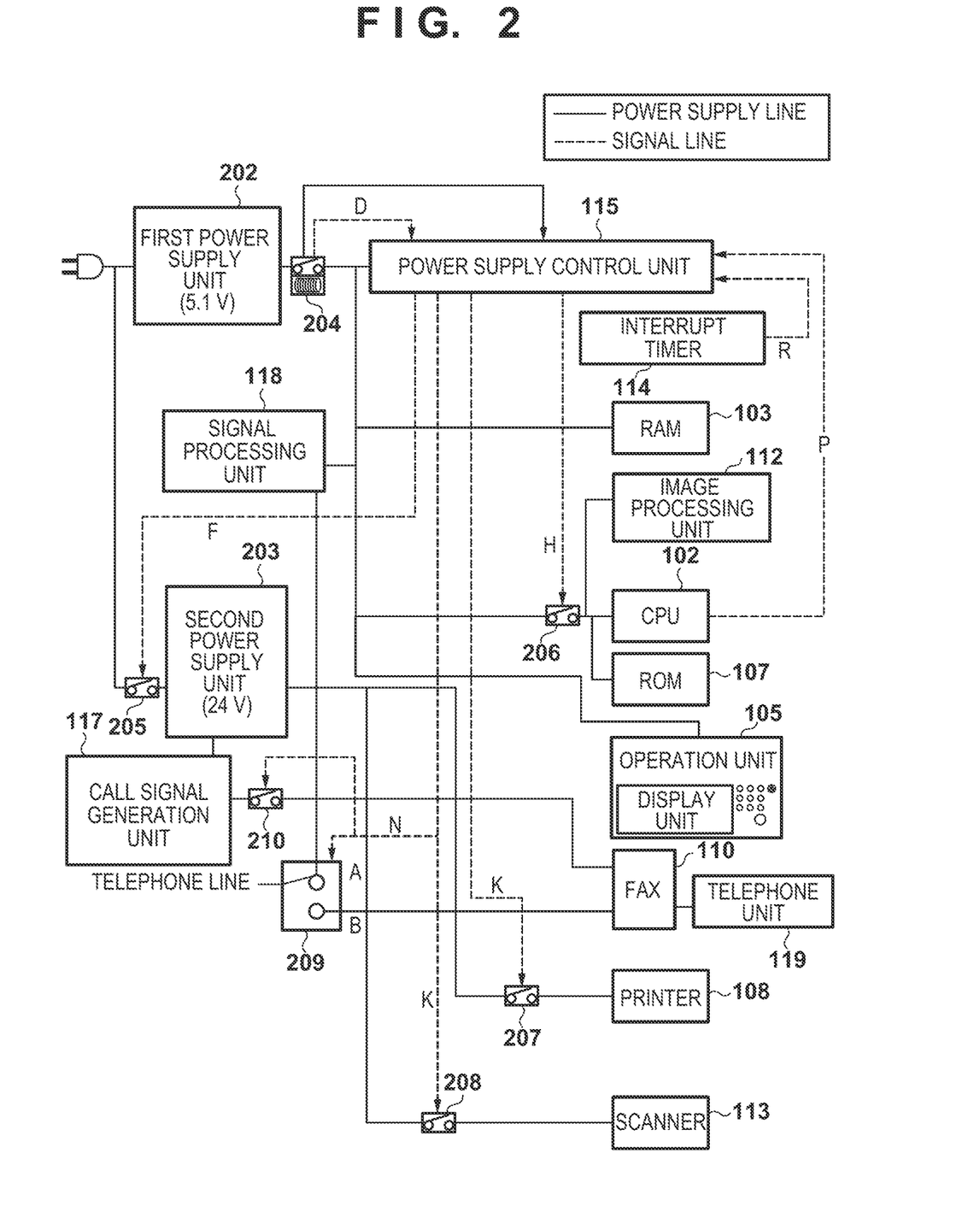
FIG. 2 is a block diagram illustrating a view of a power supply circuit of the image communication apparatus according to an embodiment.

Next, with reference with FIG. 2, description for a configuration of a power supply circuit of the image communication apparatus 10 according to the present embodiment. A first power supply unit 202 converts alternating current power supplied via a plug P to direct current power (for example, 5.1V (a first output power)), and supplies the direct current power to devices of a first power supply system. The devices of the first power supply system include the power supply control unit 115, the CPU 102, the RAM 103, the ROM 107, the operation unit 105, and the image processing unit 112, for example. The interrupt timer 114 is configured to operate by a battery, and does not need a power supply from an external.

A second power supply unit 203 converts alternating current power supplied via a plug P to direct current power (for example, 24V), and supplies power to devices of a second power supply system. Devices of the second power supply system include the printer 108, the scanner 113, and the call signal generation unit 117, for example. The call signal generation unit 117 supplies supplied power to the fax machine 110. The fax machine 110 further supplies power to the telephone unit 119. It is also possible to supply power to the fax machine 110 from a telephone line, and in this case, supply of power to the fax machine 110 from the call signal generation unit 117 is not performed.

In addition, a power supply switch 204, which enters an ON state or an OFF state in accordance with a user operation, is provided between the first power supply unit 202 and the devices of the first power supply system. A signal D indicating the state of the power supply switch 204 (the ON state or the OFF state) is inputted to the power supply control unit 115. In contrast, a relay switch 205 is provided between the plug P and the second power supply unit 203. The relay switch 205 is switched from an ON state to an OFF state or from the OFF state to the ON state, in accordance with a control signal F outputted from the power supply control unit 115.

A switch 206 is provided between the power supply switch 204 and the CPU 102, the ROM 107, and the image processing unit 112. The relay switch 206 is switched from an ON state to an OFF state or from the OFF state to the ON state, in accordance with a control signal H outputted from the power supply control unit 115.

A switch 207 is provided between the second power supply unit 203 and the printer 108. A switch 208 is provided between the second power supply unit 203 and the scanner 113. The switch 207 and the switch 208 are switched from an ON state to an OFF state or from the OFF state to the ON state, in accordance with a control signal K outputted from the power supply control unit 115.

A switch 210 is provided between the call signal generation unit 117 and the fax machine 110. In addition, a switch 209 is provided between an external telephone line, and the fax machine 110 and the signal processing unit 118. The switch 209 and the switch 210 are controlled in accordance with a control signal N outputted from the power supply control unit 115. The switch 209 is controlled to be connected to a signal processing unit 118 side (an A side) or a fax machine 110 side (a B side). When the switch 209 is connected to the signal processing unit 118 (the A side), the switch 210 is in an ON state. When the switch 209 is connected to the fax machine 110 (the B side), the switch 210 is in an OFF state.

<Power Supply State when Power is Off>

Figure 3:
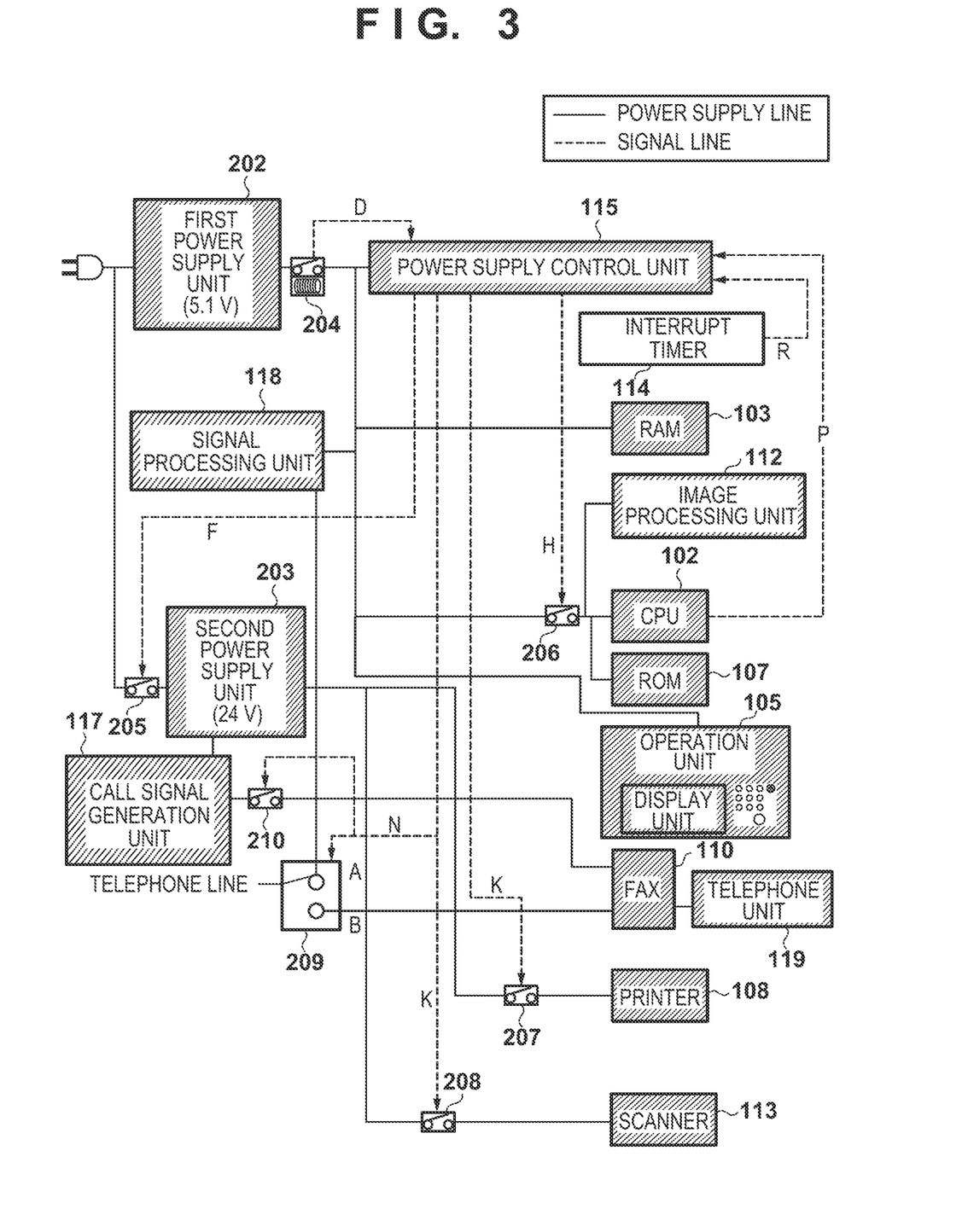
FIG. 3 is a view illustrating a power supply state when the image communication apparatus according to an embodiment is powered off.

FIG. 3 illustrates a power supply state when power is off in the image communication apparatus 10. In a power OFF state, each of the switches 204 to 208 is in the OFF state. Consequently, each component other than the interrupt timer 114 which is driven by a battery is in a state where supply of power is not performed.

<Power Supply State when in Second Sleep State>

Figure 4:
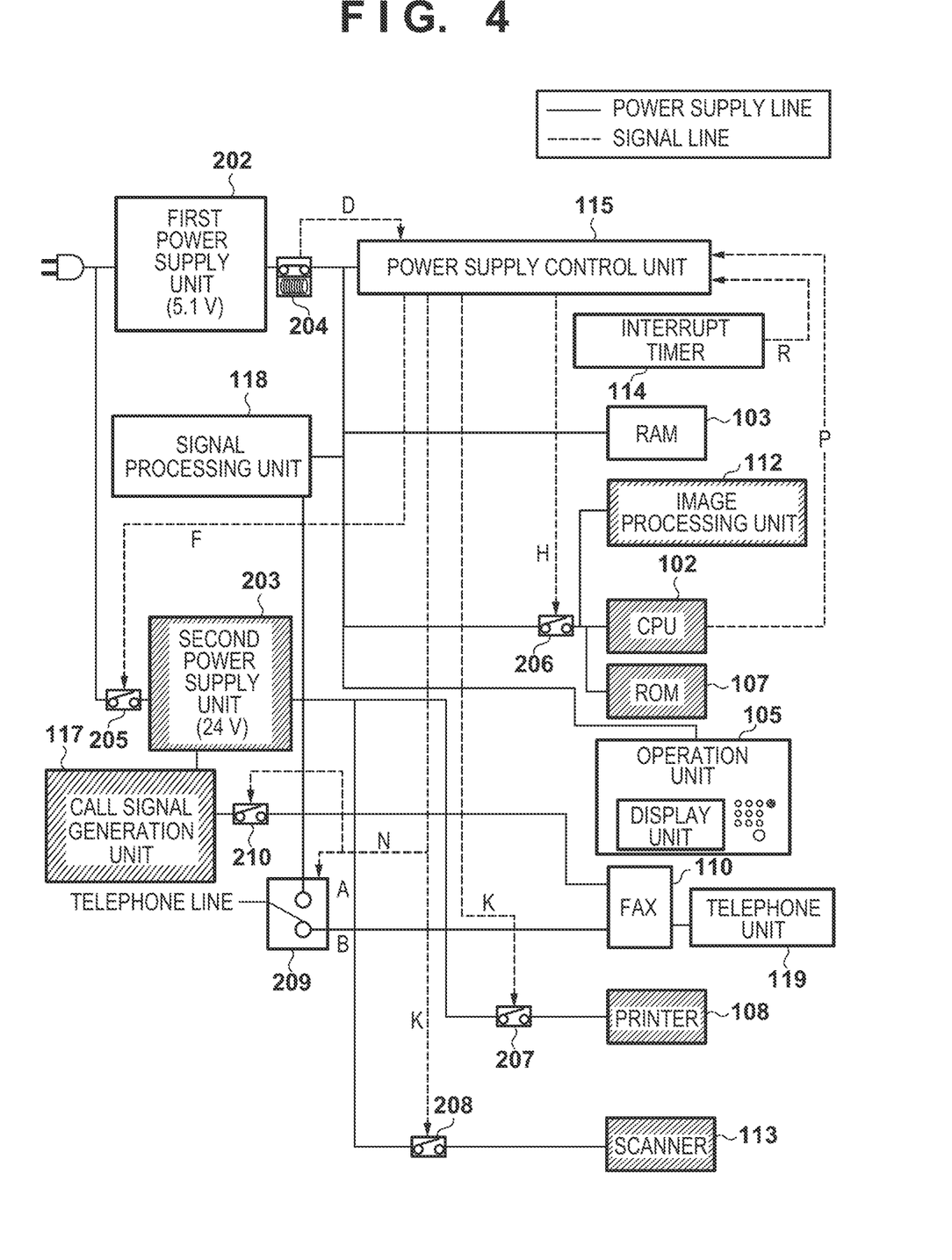
FIG. 4 is a view illustrating a power supply state when the image communication apparatus according to an embodiment is in a second sleep state.

FIG. 4 illustrates a power supply state at a time of a second sleep state in the image communication apparatus 10. The image communication apparatus 10 according to the present embodiment has a first sleep state and a second sleep state as power saving states. Here, description is given regarding a power supply state when in the second sleep state. A power supply state when in the first sleep state will be described later using FIG. 5.

In the second sleep state, the switch 204 is controlled to be in the ON state, and other switches are controlled to be in the OFF state. The switch 209 is connected to the fax machine 110 (the B side). Consequently, in the second sleep state, power is supplied to the power supply control unit 115, the RAM 103, the signal processing unit 118, the fax machine 110, and the telephone unit 119. The CPU 102 sets an interrupt time to the interrupt timer 114 when transitioning to the second sleep state. When the set interrupt time is reached (when a timer expires), the interrupt timer 114 performs an interrupt notification to the power supply control unit 115 in accordance with a control signal R. Upon receiving an interrupt notification of the control signal R, the power supply control unit 115 performs control to transition to the first sleep state. By this, the image communication apparatus 10 periodically transitions from the second sleep state to the first sleep state.

<Power Supply State when in First Sleep State>

Figure 5:
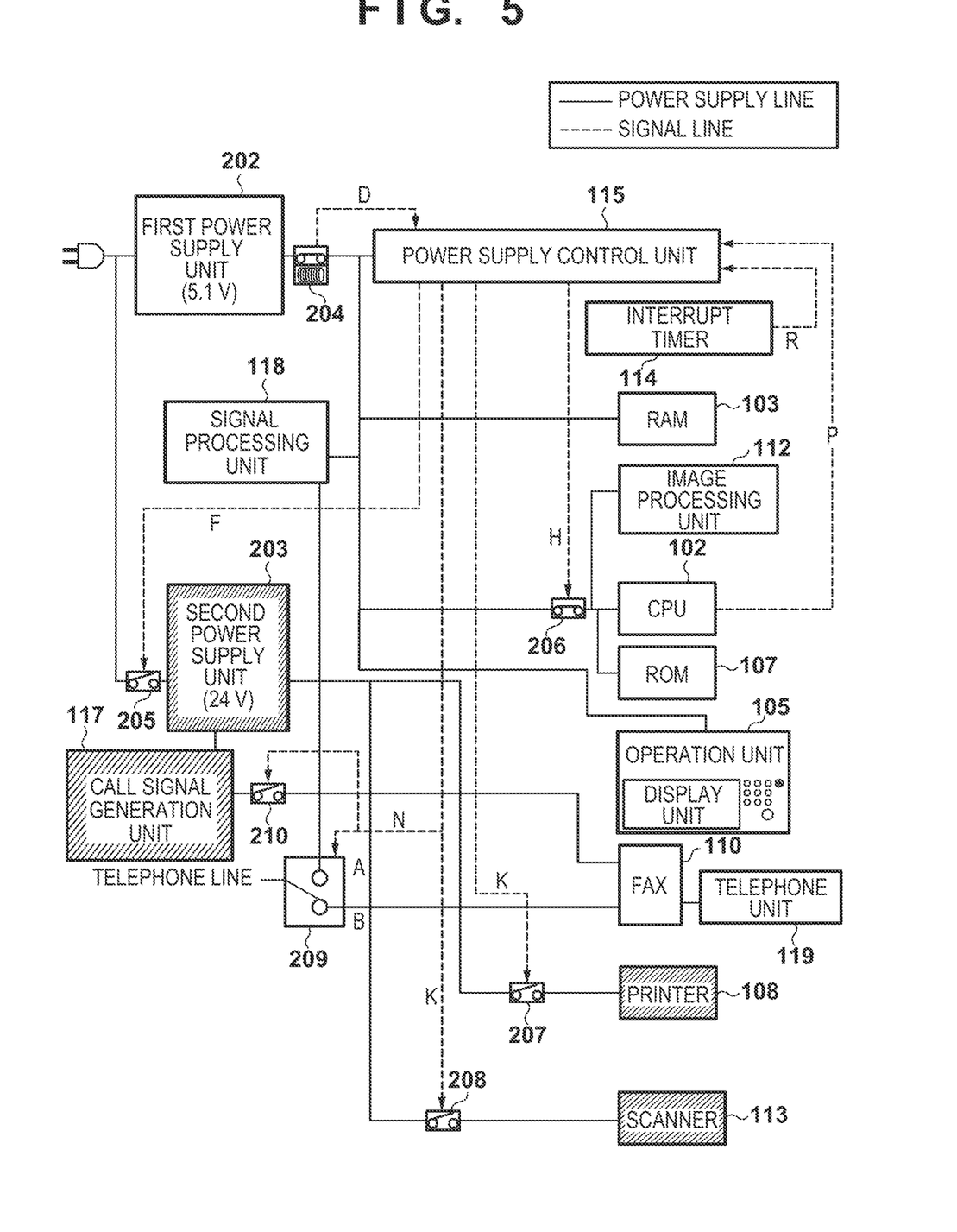
FIG. 5 is a view illustrating a power supply state when the image communication apparatus according to an embodiment is in a first sleep state.

FIG. 5 illustrates a power supply state at a time of the first sleep state in the image communication apparatus 10. In the first sleep state, the switches 204, and 206 are controlled to be in the ON state, and other switches are controlled to be in the OFF state. The switch 209 is connected to the fax machine 110 (the B side). Consequently, in the first sleep state, power is also supplied to the CPU 102, the ROM 107, the operation unit 105, and the image processing unit 112 in addition to the components that are supplied with power in the aforementioned second sleep state. In other words, the first sleep state has a lower power saving effect in comparison to the above second sleep state.

If there is no input from the operation unit I/F 104, the network I/F 106, and the telephone line for a certain amount of time after transitioning to the first sleep state, the CPU 102 makes a notification to the power supply control unit 115 to transition to the second sleep state, in accordance with the control signal P. Consequently, the image communication apparatus 10 according to the present embodiment has control for looping between the first sleep state and the second sleep state under certain conditions. Detailed control is described later. Upon receiving a notification to transition to the second sleep state on the control signal P, the power supply control unit 115 performs control to transition to the second sleep state. Upon accepting an input from the operation unit I/F 104, the network I/F 106, or the telephone line when in the first sleep state, the CPU 102 makes a notification to the power supply control unit 115 to transition to the standby state, in accordance with the control signal P. Upon receiving a notification to transition to the standby state on the control signal P, the power supply control unit 115 performs control to transition to the first standby state, which is described later.

<Power Supply State when in First Standby State>

Figure 6:
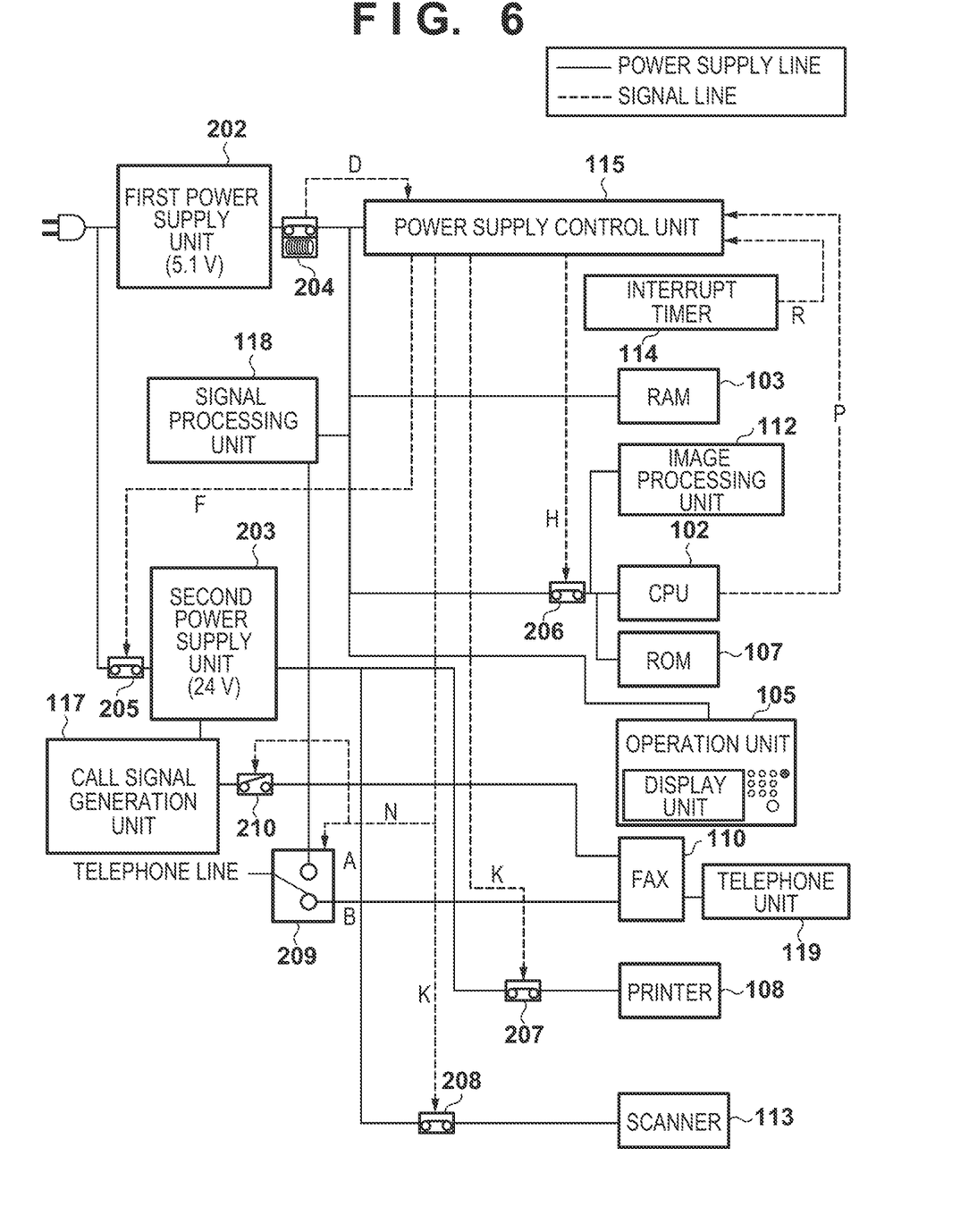
FIG. 6 is a view illustrating a power supply state when the image communication apparatus according to an embodiment is in a first standby state.

FIG. 6 illustrates a power supply state at a time of the first standby state in the image communication apparatus 10. In the first standby state, each of the switches 204 to 208 is controlled to be in the ON state. The switch 209 is connected to the fax machine 110 (the B side), and the switch 210 is controlled to be in the OFF state. Consequently, in the first standby state, power is supplied to each component.

If there is no input from the operation unit I/F 104, the network I/F 106, and the telephone line for a certain amount of time after transitioning to the first standby state, the CPU 102 makes a notification to the power supply control unit 115 to transition to the first sleep state, in accordance with the control signal P. Upon receiving a notification to transition to the first sleep state on the control signal P, the power supply control unit 115 performs control to transition to the first sleep state.

<Power Supply State when in Second Standby State>

Figure 7:
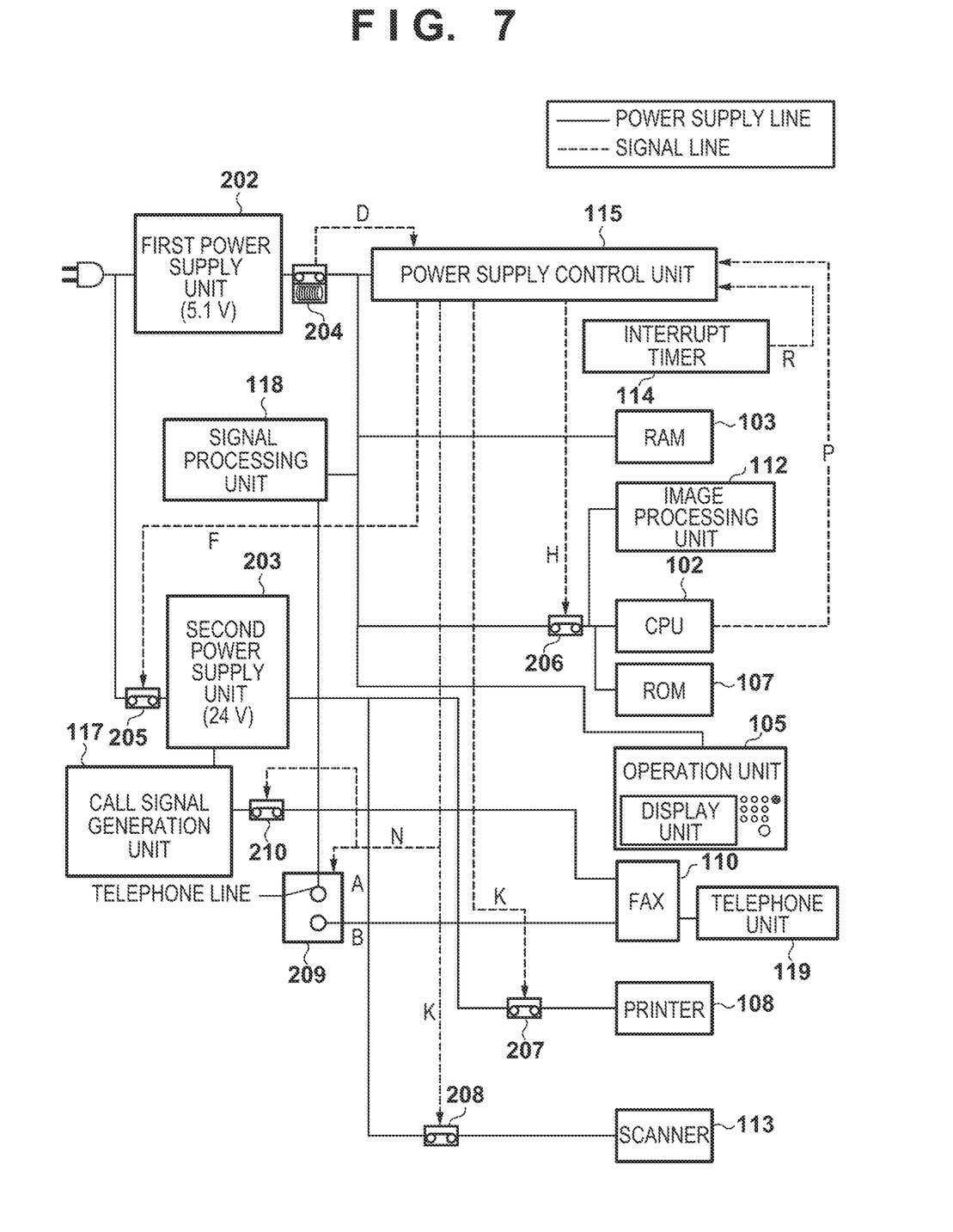
FIG. 7 is a view illustrating a power supply state when the image communication apparatus according to an embodiment is in a second standby state.

FIG. 7 illustrates a power supply state at a time of the second standby state in the image communication apparatus 10. In the second standby state, each of the switches 204 to 208 is controlled to be in the ON state. In contrast, differing to in the first standby state, the switch 209 is connected to the signal processing unit 118 (the A side), and the switch 210 is controlled to be in the ON state.

After transitioning to the second standby state, the CPU 102 performs control to not transition to the first sleep state. This control is described in detail with FIG. 9.

<Incoming Signal Setting>

Figure 8:
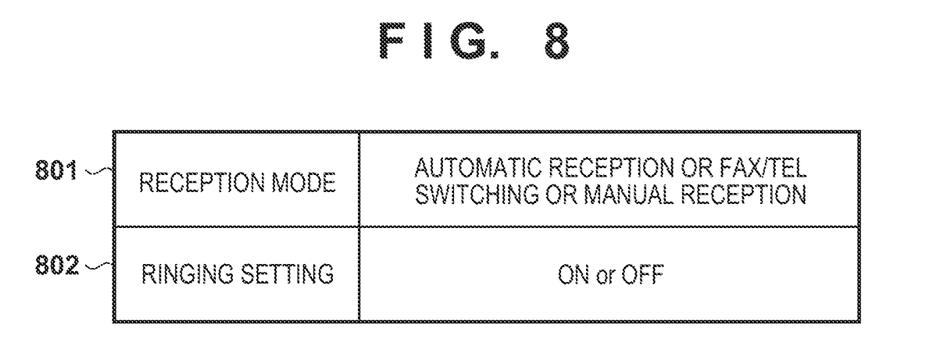
FIG. 8 is a view illustrating an example of storing a reception mode and a ringing setting value for a time of an incoming signal, which are held by the image communication apparatus according to an embodiment.

Next, with reference with FIG. 8, description is given regarding setting values that can be set in the image communication apparatus 10 according to the present embodiment. The present setting values are stored in the ROM 107.

A reception mode 801 is a setting relating to operation when there is an incoming signal from a telephone line. A value for one of automatic reception (automatic mode), FAX/TEL switching (switching mode), and manual reception (manual mode) is stored as a setting value. A ringing setting 802 is a setting for whether to cause the telephone unit 119 to ring. A value for one of ON or OFF is stored as a setting value. These values can be set in accordance with a user operation via the operation unit 105.

Description is given regarding detailed operation for each setting value pattern. If the value of the ringing setting 802 is set to ON when the reception mode 801 is automatic reception, the CPU 102 instructs the power supply control unit 115 to connect the switch 209 to the fax machine 110 (the B side). By this, the telephone unit 119 performs a ringing operation in response to a signal from the telephone line. Subsequently, a fax reception operation starts. A user cannot perform a call even if they put the telephone unit 119 in an off-hook state.

If the value of the ringing setting 802 is set to OFF when the reception mode 801 is automatic reception, the CPU 102 instructs the power supply control unit 115 to connect the switch 209 to the signal processing unit 118 (the A side). At this time, because the CPU 102 does not cause the call signal generation unit 117 to operate even if the signal processing unit 118 detects an incoming signal, the telephone unit 119 does not ring. Subsequently, a fax reception operation starts. A user cannot perform a call even if they put the telephone unit 119 in an off-hook state.

When the reception mode 801 is manual reception, the CPU 102 instructs the power supply control unit 115 to connect the switch 209 to the fax machine 110 (the B side), irrespective of the value of the ringing setting 802. By this, the telephone unit 119 performs a ringing operation in response to a signal from the telephone line. When a user puts the telephone unit 119 in an off-hook state, a fax reception operation starts if a communication partner is a fax machine (fax communication). A phone call operation starts if the communication partner is a telephone (telephone communication).

If the value of the ringing setting 802 is set to OFF when the reception mode 801 is FAX/TEL switching, the CPU 102 instructs the power supply control unit 115 to connect the switch 209 to the signal processing unit 118 (the A side). In this case, when the signal processing unit 118 has detected an incoming signal, the CPU 102 does not cause the call signal generation unit 117 to operate if a signal specific to a fax (a CNG signal or the like) is detected in the signal. In contrast, if the signal processing unit 118 does not detect a signal specific to a fax (a CNG signal or the like), the CPU 102 causes the call signal generation unit 117 to operate and output a pseudo call signal. By this, when a communication partner is a fax machine a fax reception operation is started without causing the telephone unit 119 to ring, and when a communication partner is a telephone, the telephone unit 119 is caused to ring, and when a user puts the telephone unit 119 in an off-hook state, a phone call operation starts.

If the value of the ringing setting 802 is set to ON when the reception mode 801 is FAX/TEL switching, the CPU 102 instructs the power supply control unit 115 to connect the switch 209 to the fax machine 110 (the B side). By this, the telephone unit 119 performs a ringing operation in response to a signal from the telephone line. Subsequently, if a communication partner is a fax machine, a fax reception operation starts. If a communication partner is a telephone, when a user puts the telephone unit 119 in an off-hook state, a phone call operation starts.

In this way, in a case where the value of the ringing setting 802 is set to OFF when the reception mode 801 is set to automatic reception or FAX/TEL switching, the switch 209 connects to the signal processing unit 118 (the A side), and thus the second standby state is entered instead of the first standby state.

<Processing Procedure>

Figure 9:
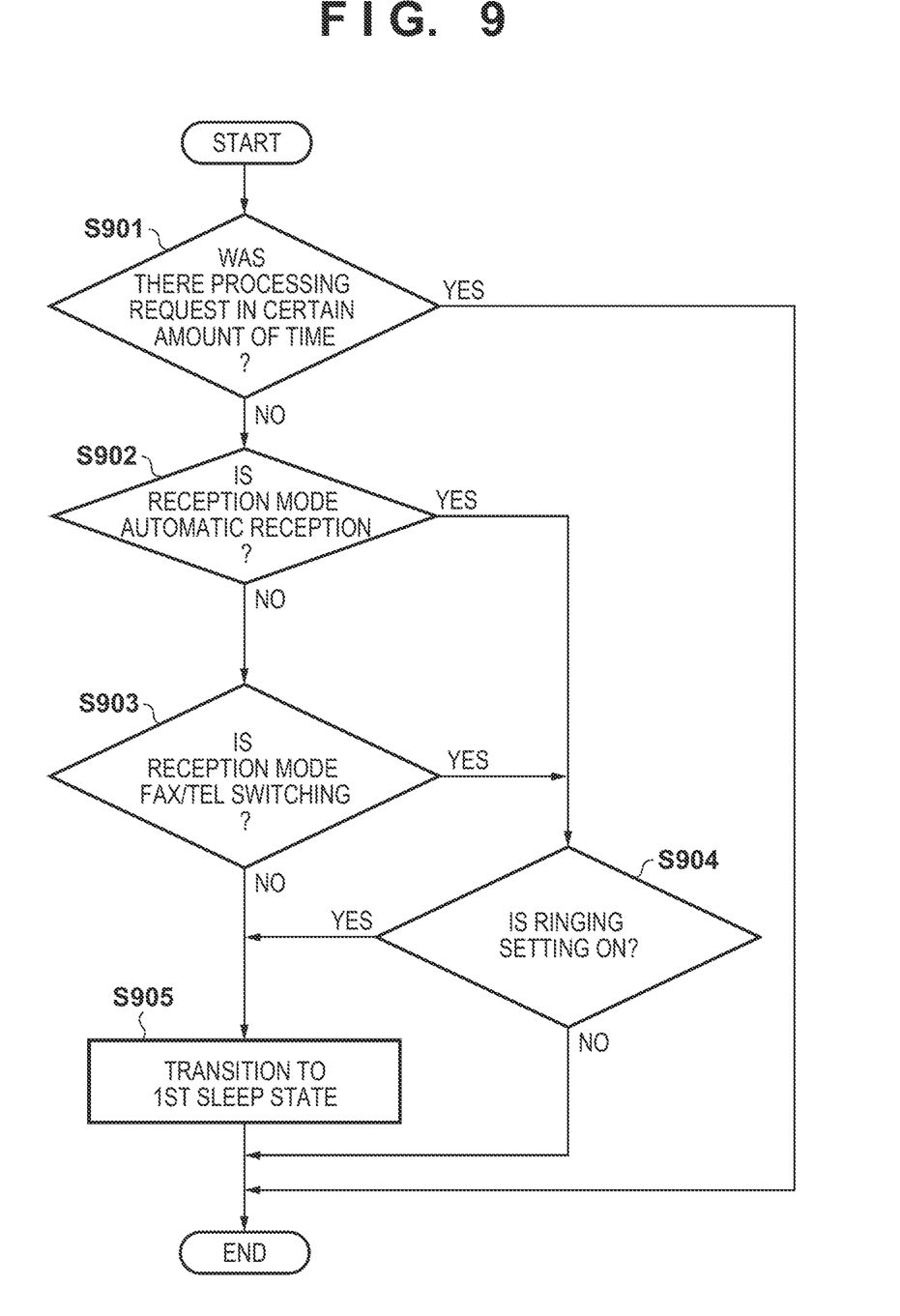
FIG. 9 is a view illustrating an operation flow for when the image communication apparatus according to an embodiment transitions from a standby state to a sleep state.

Next, with reference to FIG. 9, description is given of a processing procedure for a first sleep state transition determination that is executed when the image communication apparatus 10 according to the present embodiment is in the first standby state or the second standby state. Processed described below is realized by the CPU 102 reading a control program stored in the ROM 107 into the RAM 103, and executing the control program, for example.

Firstly, in step S901, the CPU 102 determines whether a processing request with respect to the image communication apparatus 10 has been accepted during the passage of a certain amount of time. Specifically, the CPU 102 determines in accordance with whether there is no input from the operation unit I/F 104, the network I/F 106, and the telephone line during the passage of the certain amount of time. If a processing request is accepted within a predetermined amount of time, the processing ends, and otherwise the processing proceeds to step S902.

Next, in step S902, the CPU 102 determines whether the setting of the reception mode 801 is automatic reception. This determination is performed by the CPU 102 referring to the setting value stored in the ROM 107 as illustrated by FIG. 8. If it is automatic reception, the processing proceeds to step S904, otherwise the processing proceeds to step S903. In step S904, if the reception mode 801 is set to automatic reception, the CPU 102 determines whether the ringing setting 802 is ON. If the ringing setting 802 is ON, the processing proceeds to step S905, and the CPU 102 has the operation state of the image communication apparatus 10 transition to the first sleep state, and the processing ends. In contrast, if the ringing setting 802 is OFF, the current state is maintained without transitioning to the first sleep state, and the processing ends.

However, if the reception mode 801 is not set to automatic reception, in step S903, the CPU 102 determines whether the reception mode 801 is set to FAX/TEL switching. If the reception mode 801 is set to FAX/TEL switching, the processing proceeds to step S904, and the CPU 102 determines whether the ringing setting 802 is ON. If the ringing setting 802 is ON, the processing proceeds to step S905, and the CPU 102 has the operation state of the image communication apparatus 10 transition to the first sleep state, and the processing ends. In contrast, if the ringing setting 802 is OFF, the current state is maintained without transitioning to the first sleep state, and the processing ends.

If the reception mode 801 is not set to the FAX/TEL switching in step S903, the processing proceeds to step S905, and the CPU 102 has the operation state of the image communication apparatus 10 transition to the first sleep state, and processing ends.

In accordance with this flow, in a case where the value of the ringing setting 802 is set to OFF when the reception mode 801 is set to automatic reception or FAX/TEL switching, the image communication apparatus 10 controls to not transition to the first sleep state. This is because, if there is a transition to the first sleep state when the switch 209 is connected to the signal processing unit 118 (the A side), it is not possible to supply power necessary for portions necessary when the ringing setting 802 is OFF, such as the call signal generation unit 117. In addition, while a determination is made in this flow to transition to the first sleep state in accordance with values of the reception mode 801 and the ringing setting 802, configuration may be taken to, when in the second standby state, continue to continuously maintain the second standby state without the execution of this flow itself.

As described above, the image communication apparatus according to the present embodiment has, as operation states, standby states and power saving states that have lower power consumption than the standby states, and sets the existence or absence of a ringing operation for a time of an incoming signal in accordance with a user operation. In addition, when conditions for the image communication apparatus to transition from the standby state to the power saving state are satisfied, if it is set so that there is a ringing operation when there is an incoming signal, the operation state is caused to transition from the standby state to the power saving state, and the standby state is maintained if it is set so that there is no ringing operation when there is an incoming signal. With such a configuration, the image communication apparatus according to the present embodiment can suitably perform power saving control in consideration of the necessity of non-ringing control, so as to avoid a state where it is not possible to guarantee power necessary for the non-ringing control.

Second Embodiment

Below, description will be given for a second embodiment of the present invention. In the first embodiment described above, the CPU 102 determines, in accordance with values of the reception mode 801 and the ringing setting 802, whether to transition to the first sleep state (a first power saving state) or maintain the second standby state. However, in the present embodiment, a third sleep state (a second power saving state) is newly provided, and a determination is made as to whether to transition to this third sleep state. Note that, in the present embodiment, the same reference numerals are added to configuration and control that is similar to that of the foregoing first embodiment, and description thereof is omitted.

<Power Supply State when in First Standby State>

Figure 10:
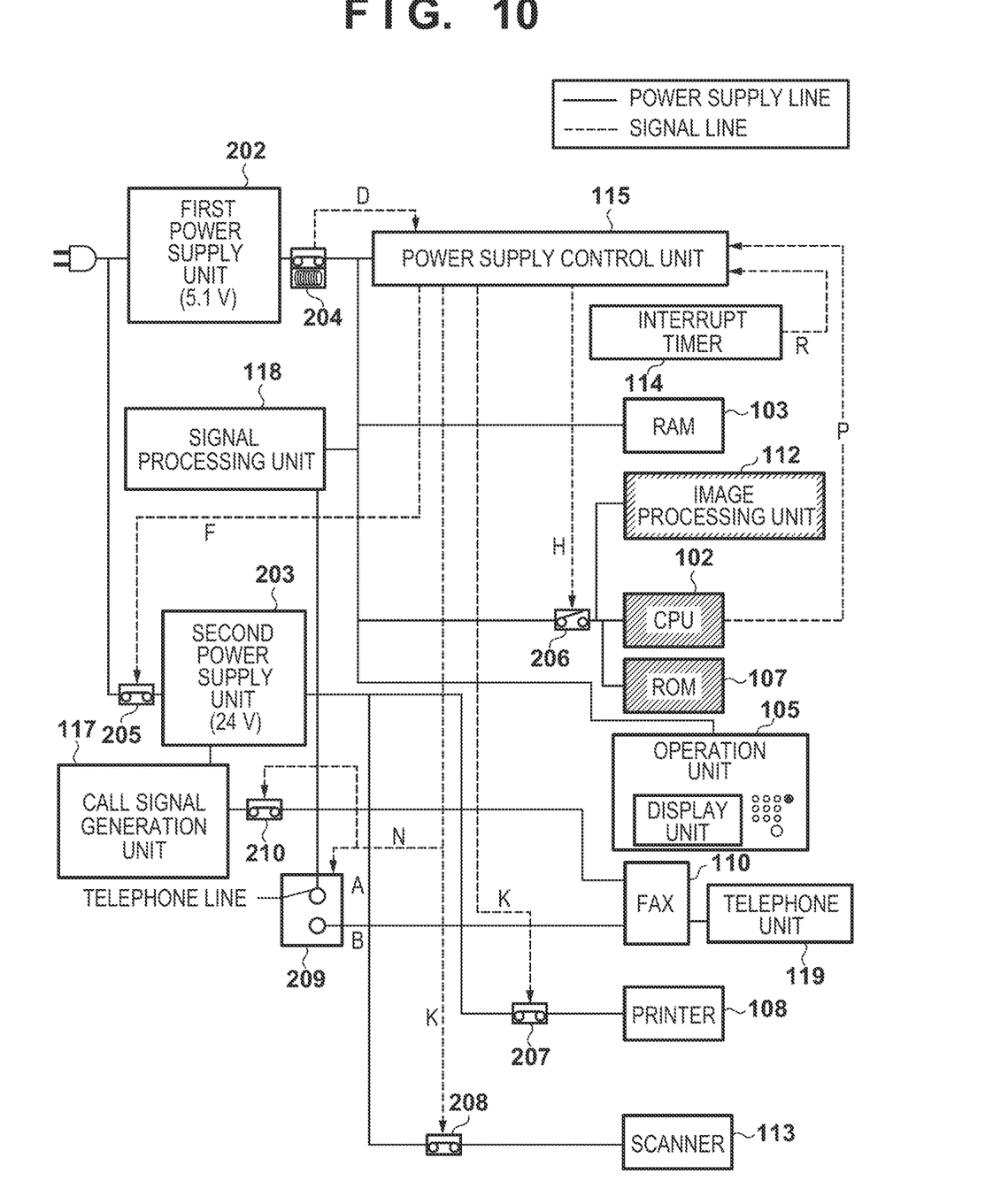
FIG. 10 is a view illustrating a power supply state when the image communication apparatus according to an embodiment is in a third sleep state.

FIG. 10 illustrates a power supply state when the image communication apparatus 10 according to the present embodiment is in the third sleep state. In the third sleep state, the switch 206 is controlled to be in the OFF state, and other switches are controlled to be in the ON state. The switch 209 is connected to the signal processing unit 118 (the A side). The CPU 102 periodically transitions to the second standby state after transitioning to the third sleep state. Upon accepting an input from the operation unit I/F 104, the network I/F 106, or the telephone line when in the first sleep state, the CPU 102 makes a notification to the power supply control unit 115 to transition to the second standby state, in accordance with the control signal P. Upon receiving a notification to transition to the standby state on the control signal P, the power supply control unit 115 performs control to transition to the second standby state.

<Processing Procedure>

Figure 11:
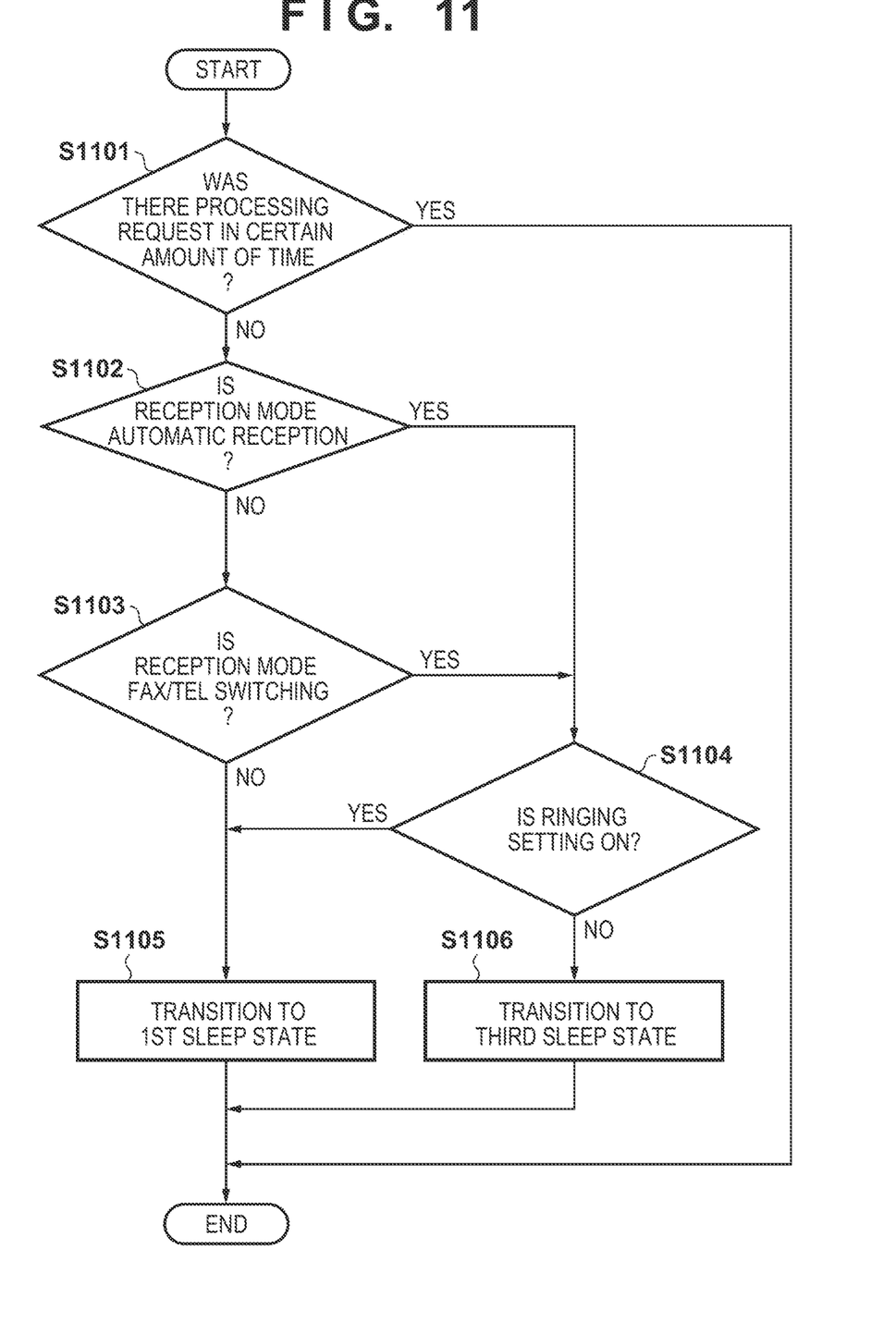
FIG. 11 is a view illustrating an operation flow for when the image communication apparatus according to an embodiment transitions from a standby state to a sleep state.

Next, with reference to FIG. 11, description is given a processing procedure for a first sleep state transition determination that is executed when the image communication apparatus 10 according to the present embodiment is in the first standby state or the second standby state. Processed described below is realized by the CPU 102 reading a control program stored in the ROM 107 into the RAM 103, and executing the control program, for example.

Firstly, in step S1101, the CPU 102 determines whether a processing request has been accepted during the passage of a certain amount of time. Specifically, the CPU 102 determines in accordance with whether there is no input from the operation unit I/F 104, the network I/F 106, and the telephone line during the passage of the certain amount of time. If a processing request is accepted within a predetermined amount of time, the processing ends, and otherwise the processing proceeds to step S1102.

In step S1102, the CPU 102 determines whether the setting of the reception mode 801 is automatic reception. This determination is performed by the CPU 102 referring to the setting value stored in the ROM 107 as illustrated by FIG. 8. If it is automatic reception, the processing proceeds to step S1104, otherwise the processing proceeds to step S1103. In step S1104, if the reception mode 801 is set to automatic reception, the CPU 102 determines whether the ringing setting 802 is ON. If the ringing setting 802 is ON, the processing proceeds to step S1105, and the CPU 102 has the operation state of the image communication apparatus 10 transition to the first sleep state, and the processing ends. In contrast, if the ringing setting 802 is OFF, the processing proceeds to step S1106, and the CPU 102 has the operation state of the image communication apparatus 10 transition to the third sleep state, and the processing ends.

If in step S1102 the reception mode 801 is not set to automatic reception, the processing proceeds to step S1103, and the CPU 102 determines whether the reception mode 801 is set to FAX/TEL switching. If the reception mode 801 is set to FAX/TEL switching, the processing proceeds to step S1104, and the CPU 102 determines whether the ringing setting 802 is ON. If the ringing setting 802 is ON, the processing proceeds to step S1105, and the CPU 102 has the operation state of the image communication apparatus 10 transition to the first sleep state, and the processing ends. In contrast, if the ringing setting 802 is OFF, the processing proceeds to step S1106, and the CPU 102 has the operation state of the image communication apparatus 10 transition to the third sleep state, and the processing ends.

If the reception mode 801 is not set to the FAX/TEL switching in step S1103, the processing proceeds to step S1105, and the CPU 102 has the operation state of the image communication apparatus 10 transition to the first sleep state, and processing ends.

In accordance with this flow, in a case where the value of the ringing setting 802 is set to OFF when the reception mode 801 is set to automatic reception or FAX/TEL switching, the image communication apparatus 10 controls to transition to the third sleep state without transitioning to the first sleep state. This is because, if there is a transition to the first sleep state when the switch 209 is connected to the signal processing unit 118 (the A side), it is not possible to supply power necessary for portions necessary when the ringing setting 802 is OFF, such as the call signal generation unit 117.

When conditions for the image communication apparatus according to the present embodiment to transition from the standby state to the power saving state are satisfied, if it is set so that there is a ringing operation when there is an incoming signal, the operation state is caused to transition from the standby state to the first power saving state (the above-described first sleep state). In contrast, if there is a setting for no ringing operation at the time of an incoming signal, the image processing apparatus transitions to the second power saving state (the above-described third sleep state) instead of maintaining the standby state as in the foregoing the first embodiment. By this, in comparison to the foregoing first embodiment, it is possible to maintain operation by saving power as much as possible, even if non-ringing operation is set.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095638 filed on May 17, 2018, which is hereby incorporated by reference herein in its entirety.

What is claimed is:

1. An image communication apparatus operable to receive a signal from an external device and operable in a first power state and a second power state with a lower power consumption than the first power state, the image communication apparatus comprising:
   a ringing device that rings in response to:
   a signal from a telephonic line; and
   a call signal;
   a call signal output circuit that outputs the call signal to the ringing device;
   a controller, including one or more processors, that sets the ringing device to ring or not ring when receiving fax data; and
   a power controller that:
   shifts a power state of the image communication apparatus from the first power state to the second power state where power supply to the call signal output circuit is stopped based on a lapse of a predetermined time while the ringing device is set to ring when receiving fax data; and
   maintains the power supply to the call signal output circuit while the ringing device is set to not ring when receiving fax data.

2. The image communication apparatus according to claim 1, wherein the power controller shifts the power state of the image communication apparatus from the first power state to the second power state based on the lapse of the predetermined time without receiving a processing request while the ringing device is set to ring when receiving fax data.

3. The image communication apparatus according to claim 1, wherein the power controller maintains the power supply to the call signal output circuit while the ringing device is set to not ring when receiving fax data, even in a case where the predetermined time elapsed.

4. The image communication apparatus according to claim 1, wherein:
   the controller further sets a reception mode relating to operation when there is an incoming signal from the telephone line,
   the reception mode includes an automatic mode for automatically performing a reception operation without intermediation of a user operation, a manual mode for performing a reception operation via a user operation, and a switching mode for performing a reception operation by switching between fax communication and telephone communication, and
   the power controller shifts the power state of the image communication apparatus from the first power state to the second power state based on the lapse of the predetermined time while the ringing device is set to ring when receiving fax data, in a case where the reception mode is the automatic mode or the switching mode.

5. The image communication apparatus according to claim 4, wherein the power controller:
   in a case where the reception mode is in the manual mode, shifts the power state of the image communication apparatus from the first power state to the second power state regardless of whether or not the ringing device is set to ring when receiving fax data; and
   in a case where the reception mode is in the automatic mode or the switching mode, maintains the power supply to the call signal output circuit regardless of the predetermined condition while the ringing device is set to not ring when receiving fax data.

6. The image communication apparatus according to claim 4, further comprising a switching device that:
   switches to supply power from a public line to a network control device inside the image communication apparatus for supplying power to the ringing device while the ringing device is set to ring when receiving fax data; and
   switches to not supply power from the public line to the network control device while the ringing device is set to not ring when receiving fax data.

7. The image communication apparatus according to claim 6, wherein:
   the image communication apparatus is operable in a third power state with a lower power consumption than the first power state and a higher power consumption than the second power state, and
   the power controller shifts the power state of the image communication apparatus from the first power state to the third power state based on the lapse of the predetermined time while the ringing device is set to ring when receiving fax data.

8. The image communication apparatus according to claim 4, wherein the controller outputs a pseudo call signal to the ringing device based on a predetermined incoming signal from the external device while the ringing device is set to not ring when receiving fax data.

9. A method of controlling an image communication apparatus operable to receive a signal from an external device and operable in a first power state and a second power state with a lower power consumption than the first power state, the method comprising:
   ringing a ringing device in response to:
   a signal from a telephonic line; and
   a call signal;
   outputting, using a call signal output circuit, the call signal to the ringing device;
   setting the ringing device to ring or not ring when receiving fax data;
   shifting a power state of the image communication apparatus from the first power state to the second power state where power supply to the call signal output circuit is stopped based on a lapse of a predetermined time while the ringing device is set to ring when receiving fax data; and
   maintaining the power supply to the call signal output circuit while the ringing device is set to not ring when receiving fax data.

10. The method according to claim 9, the shifting of the power state of the image communication apparatus shifts the power state of the image communication apparatus from the first power state to the second power state based on the lapse of the predetermined time without receiving a processing request while the ringing device is set to ring when receiving fax data.

11. The method according to claim 10, wherein the maintaining of the power supply to the call signal output circuit maintains the power supply to the call signal output circuit while the ringing device is set to not ring when receiving fax data, even in a case where the predetermined time elapsed.

12. The method according to claim 9, further comprising:
setting a reception mode relating to operation when there is an incoming signal from the telephone line,
wherein the reception mode includes an automatic mode for automatically performing a reception operation without intermediation of a user operation, a manual mode for performing a reception operation via a user operation, and a switching mode for performing a reception operation by switching between fax communication and telephone communication, and
wherein the shifting of the power state of the image communication apparatus shifts the power state of the image communication apparatus from the first power state to the second power state based on the lapse of the predetermined time while the ringing device is set to ring when receiving fax data, in a case where the reception mode is the automatic mode or the switching mode.

13. The method according to claim 12, wherein:
the shifting of the power state of the image communication apparatus shifts the power state of the image communication apparatus from the first power state to the second power state regardless of whether the ringing device is set to ring or not ring when receiving fax data, in a case where the reception mode is the manual mode, and
the maintaining of the power supply to the call signal output circuit maintains the power supply to the call signal regardless of the predetermined condition while the ringing device is set to not ring when receiving fax data, in a case where the reception mode is in the automatic mode or the switching mode.

14. The method according to claim 12, further comprising:
switching to supply power from a public line to a network control device inside the image communication apparatus for supplying power to the ringing device while the ringing device is set to ring when receiving fax data; and
switching to not supply power from the public line to the network control device while the ringing device is set to not ring when receiving fax data.

15. The method according to claim 14, wherein:
the image communication apparatus is operable in a third power state with a lower power consumption than the first power state and a higher power consumption than the second power state, and
the method further comprises shifting the power state of the image communication apparatus from the first power state to the third power state based on the lapse of the predetermined time while the ringing device is set to not ring when receiving fax data.

16. The method according to claim 12, further comprising outputting a pseudo call signal to the ringing device based on a predetermined incoming signal from the external device while the ringing device is set to not ring when receiving fax data.

17. An image communication apparatus operable to receive a signal from an external device, the image communication apparatus comprising:
a ringing device that rings in response to:
a signal from a telephonic line; and
a call signal;
a call signal output circuit that outputs the call signal to the ringing device;
a controller, including one or more processors, that sets the ringing device to ring or not ring when receiving fax data from the external device, and controls the call signal output circuit to output the calling signal to the ringing device; and
a power controller that:
stops power supply to the call signal output circuit based on a predetermined condition while the ringing device is set to ring when receiving fax data; and
maintains the power supply to the call signal output circuit regardless of the predetermined condition while the ringing device is set to not ring when receiving fax data.

18. The image communication apparatus according to claim 17, wherein:
the controller further sets a reception mode relating to operation when there is an incoming signal from the telephone line,
the reception mode includes an automatic mode for automatically performing a reception operation without intermediation of a user operation, a manual mode for performing a reception operation via a user operation, and a switching mode for performing a reception operation by switching between fax communication and telephone communication, and
the power controller stops the power supply to the call signal output circuit based on the predetermined condition while the ringing device is set to ring when receiving fax data, in a case where the reception mode is the automatic mode or the switching mode.

19. The image communication apparatus according to claim 18, wherein the power controller:
in a case where the reception mode is in the manual mode, stops the power supply to the call signal output circuit based on the predetermined condition regardless of whether the ringing device is set to ring or not ring when receiving fax data; and
in a case where the reception mode is in the automatic mode or the switching mode, maintains the power supply to the call signal output circuit regardless of the predetermined condition while the ringing device is set to not ring when receiving fax data.

20. The image communication apparatus according to claim 18, further comprising a switching device that:
switches to supply power from a public line to a network control device inside the image communication apparatus for supplying power to the ringing device while the ringing device is set to ring when receiving fax data; and
switches to not supply power from the public line to the network control device while the ringing device is set to not ring when receiving fax data.

21. The image communication apparatus according to claim 18, wherein the controller outputs a pseudo call signal to the ringing device based on a predetermined incoming signal from the external device while the ringing device is set to not ring when receiving fax data.

\* \* \* \* \*